UNITED STATES PATENT OFFICE.

CHARLES F. BURGESS, OF MADISON, WISCONSIN, ASSIGNOR TO BURGESS BATTERY COMPANY, OF MADISON, WISCONSIN, A CORPORATION OF WISCONSIN.

MANUFACTURE OF DRY CELLS.

1,305,251.      Specification of Letters Patent.     Patented June 3, 1919.

No Drawing.     Application filed October 20, 1917. Serial No. 197,554.

*To all whom it may concern:*

Be it known that I, CHARLES F. BURGESS, a citizen of the United States, residing at Madison, in the county of Dane, State of Wisconsin, have invented certain new and useful Improvements in the Manufacture of Dry Cells, (Case II;) and I do hereby declare the following to be a full, clear, and exact description of the invention, such as will enable others skilled in the art to which it appertains to make and use the same.

In the manufacture of galvanic batteries of the type commonly designated as "dry cells," it is the common practice to employ manganese dioxid as one of the important ingredients. This managnese dioxid, often designated merely as "manganese," is mixed with powdered graphite, carbon, or the like, to serve as an envelop for the electro-negative element of the cell and yields oxygen to lessen the polarization of the cell while in action. Manganese dioxid as so used has usually been in the form of manganese ore, ground to a 20-mesh size, or finer. The material which has been the standard for this work has been the high grade pyrolusite ore obtained from Russia, and analyzing about 85% $MnO_2$ and less than 1% of iron. Ores from other sources have been used to a comparatively small extent, due largely to their lower percentage of active oxygen, their greater impurity, and to other disadvantageous qualities which give to dry cells made therewith less ampere hour capacity and a shorter shelf life than has been obtainable with the high grade Russian material.

It is the object of my present invention to make available and to use for the manufacture of high grade dry cells, material not heretofore used for that purpose; and under the term "ores," as used herein, I intend to include manganese oxid materials recovered or obtainable as by-products in the industrial arts.

I have found that if such low grade manganese oxid ores are used, without preliminary treatment, in the production of dry cells, certain of their impurities are harmful to the capacity of the cell and other of their impurities are exceedingly detrimental to shelf life. I have found in such ores considerable quantities of manganese oxids lower in oxygen than $MnO_2$, and I have ascertained by extended experiment and tests that these lower oxids, carbonates of alkali metals and iron oxids, are inert and thereby reduce the ampere hour capacity of the cell. I have also found in some ores appreciable quantities of arsenic, antimony, nickel, chromium, cobalt or copper, and have ascertained that these impurities are exceedingly detrimental to shelf life. The lower oxids occupy space which could be occupied by active manganese oxids and the other impurities above named are particularly harmful because they go into solution in the electrolyte of the cell after the cell has been made up, and when they are thus in solution, they come in contact with the zinc electrode of the cell, causing corrosion and incrustation, thereby giving to the cell a lower ampere hour capacity and a short shelf life.

To effect removal of these impurities, I subject the ground ore to treatment with a solvent which has a greater dissolving power than has the sal ammoniac-zinc chlorid electrolyte commonly employed in dry cells. This may be an aqueous solution and preferably is a dilute mineral acid such as a 10% solution of sulfuric acid or an equivalent solution of niter cake ($NaHSO_4$) or a 5% solution of hydrochloric acid.

The lower oxids of manganese are more soluble than manganese dioxid, and the harmful impurities such as arsenic, antimony, nickel, cobalt, chromium, and copper are likewise more soluble, so that on subjection to this treatment with a solvent which has a greater solvent action on the impurities than has the electrolyte used in a dry cell, those impurities pass into solution as chlorids, if hydrochloric acid is used, or as sulfates, if sulfuric acid or niter cake is used, so that on washing and drying of the residue there is obtained a relatively pure or high grade manganese dioxid. This I have found entirely satisfactory for use as a depolarizing material in the manufacture of dry cells. When using a mineral acid solution as specified for this treatment, I find that purification is substantially complete with 20-mesh material after agitation with the solvent for 1 to 8 hours. Treatment can be carried on at room temperature or can be hastened by heating.

I have found that the ampere hour capacity of a dry cell is dependent not only on the percentage of $MnO_2$ in the depolarizing material, but also upon the physical condition of this material. A hard, dense ore gives less satisfactory results than a softer, porous material, and in a companion application, Serial No. 197,553 filed October 20, 1917, I have described and claimed a roasting treatment of a manganese oxid ore whereby some of the $MnO_2$ is converted to a lower oxid and thereafter is extracted with an acid solution to leave a porous residue which, as I have found, is more active as a depolarizer and operates more efficiently in a dry cell than manganese material not so treated.

This roasting operation may be combined with the acid treatment herein disclosed, as a preliminary step, particularly if the ore is hard and dense. The resultant product is then rendered porous not only by removal of the lower oxids, carbonates of the alkaline earths and iron oxid, but also by removal of the arsenic, antimony, nickel, cobalt, copper, chromium, and the like, and furthermore, the porosity which results from the dissolving lower oxids, assists the acid in gaining access to all parts of the grains under treatment, and thus contributes to complete removal of the harmful impurities.

The heating or roasting operation may be effected in about 1 to 4 hours at a temperature of about 600° C. for this will convert enough of the $MnO_2$ to a lower oxid to serve the purposes of the present process. The ore may be ground to a size of 20-mesh or finer, either before or after roasting.

In making dry cells out of low grade ore, purified as above described, and either with or without the preliminary roasting operation, I proceed according to well known methods, mixing the purified manganese dioxid with carbonaceous material, such as graphite or a mixture of graphite and carbon, together with an electrolyte of salammoniac-zinc chlorid, assembling the materials between the electrodes of the cell in well known manner. I find that the resultant dry cell is of high grade in every way with good ampere hour capacity, good shelf life and in every respect comparable to high grade cells made with Russian pyrolusite of best quality, and in the case of preliminary roasting, acquiring from that operation a certain superiority due as I believe to the more intimate contact between the manganese dioxid and the graphite electrolyte and other materials, which enter into the construction of the cell, or are produced therein when the cell is in action.

I claim:

1. The method which consists in treating a manganese oxid ore with a solvent more active thereon than the sal ammoniac-zinc chlorid electrolyte commonly employed in dry cells, thereby to dissolve out impurities of the ore, and intimately mixing the purified residue with carbonaceous material to form a depolarizing mix for dry cells.

2. The method which consists in treating a manganese oxid ore with a mineral acid solution to dissolve out impurities of the ore, and intimately mixing the purified residue with carbonaceous material to form a depolarizing mix for dry cells.

3. The method which consists in treating a manganese oxid ore with a mineral acid solution to dissolve out as sulfates impurities contained in the ore, and intimately mixing the purified residue with carbonaceous material to form a depolarizing mix for dry cells.

4. The method which consists in treating a manganese oxid ore with a dilute solution of sulfuric acid, washing the residue of manganese dioxid, and intimately mixing said residue with carbonaceous material to form a depolarizing mix for dry cells.

5. The method which consists in roasting an impure manganese oxid ore to convert some of its manganese dioxid to a lower oxid, treating with mineral acid solution to dissolve out said oxid and other impurities and leave a residue of relatively pure and porous manganese dioxid, and intimately mixing therewith carbonaceous material, to form a depolarizing mix for dry cells.

6. A depolarizing mix for dry cells, comprising a carbonaceous material intimately associated with manganese dioxid rendered relatively pure by preliminary treatment with a solvent more active than the sal ammoniac-zinc chlorid electrolyte commonly employed in dry cells; substantially as described.

In testimony whereof I affix my signature.

CHARLES F. BURGESS.